No. 646,419. Patented Apr. 3, 1900.
J. P. DORAN.
ROTARY ENGINE.
(Application filed May 1, 1899.)
(No Model.) 5 Sheets—Sheet 1.

Witnesses:
C. H. Keeney
Anna C. Faust

Inventor:
John P. Doran
By Benedict and Morsell
Attorneys

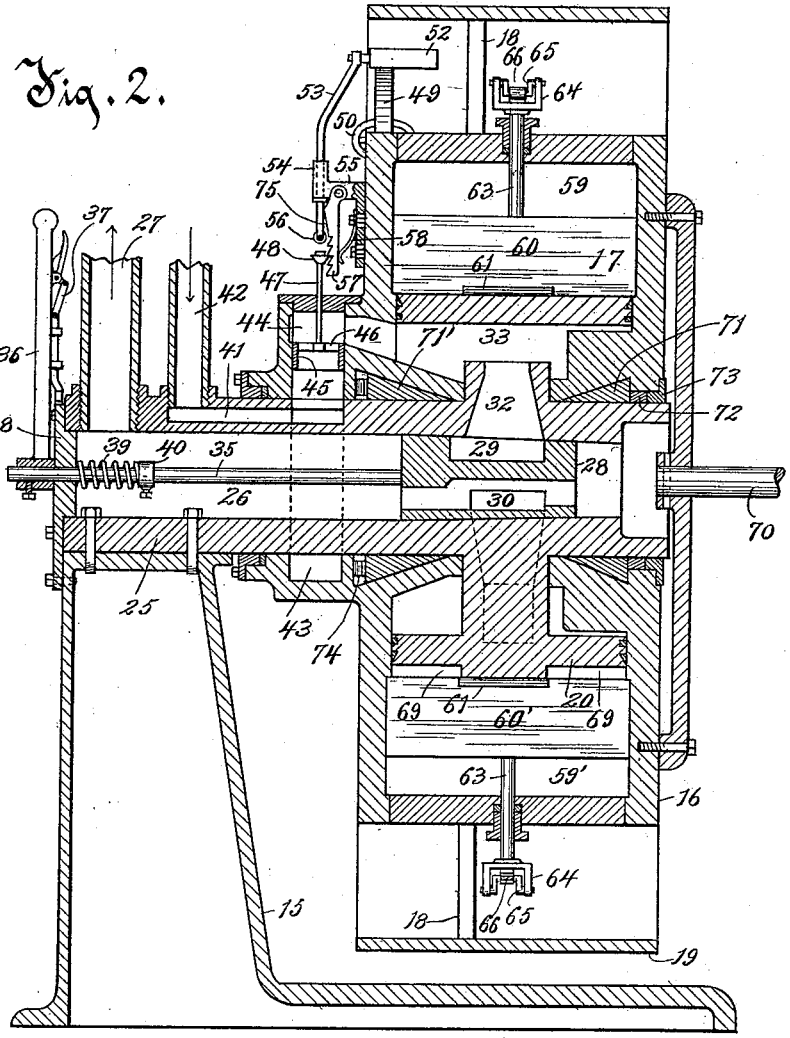
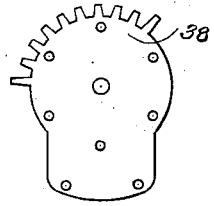
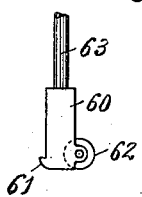

No. 646,419. Patented Apr. 3, 1900.
J. P. DORAN.
ROTARY ENGINE.
(Application filed May 1, 1899.)
(No Model.) 5 Sheets—Sheet 3.

Witnesses. Inventor.
John P. Doran
By Benedict & Morsell
Attorneys.

No. 646,419. Patented Apr. 3, 1900.
J. P. DORAN.
ROTARY ENGINE.
(Application filed May 1, 1899.)
(No Model.) 5 Sheets—Sheet 4.
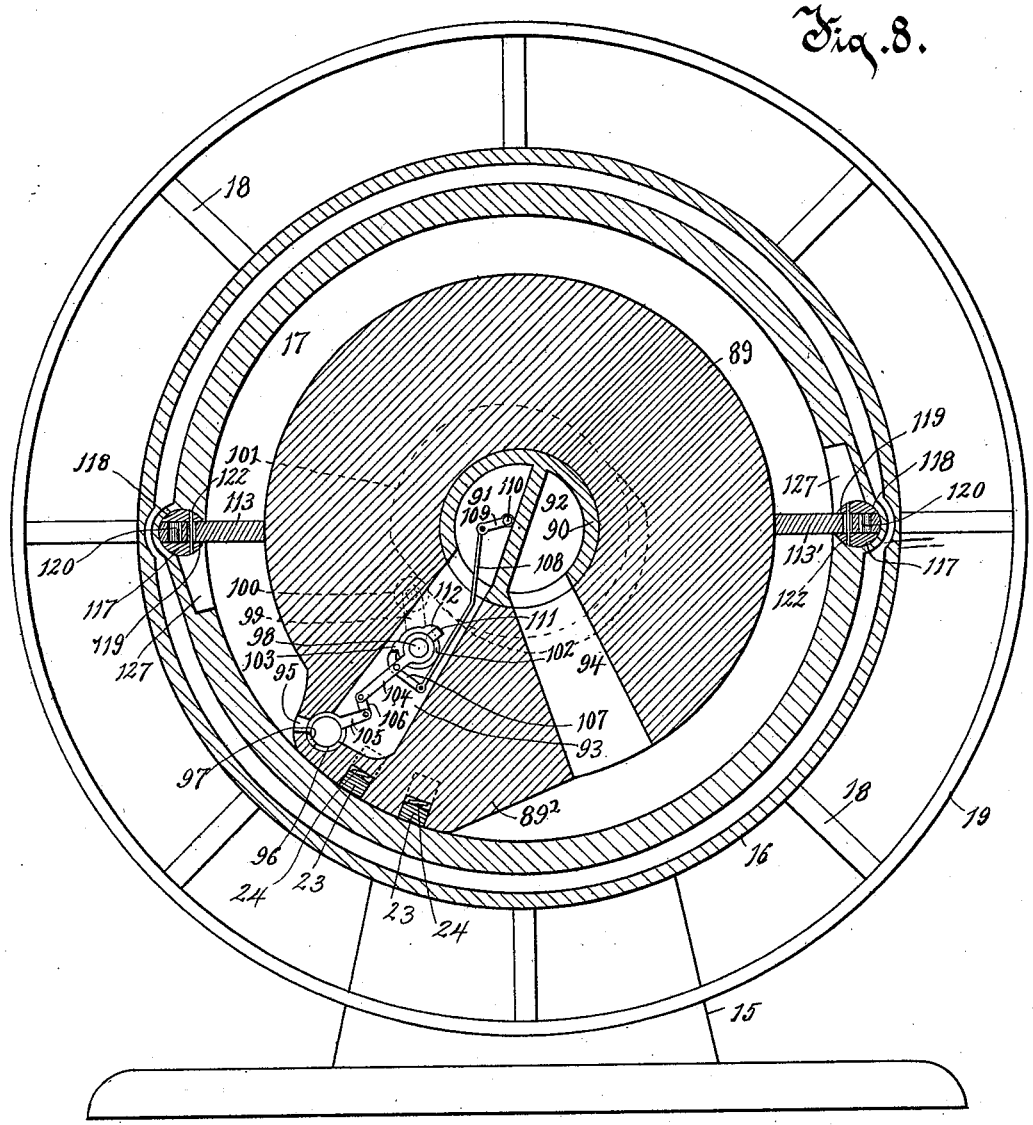
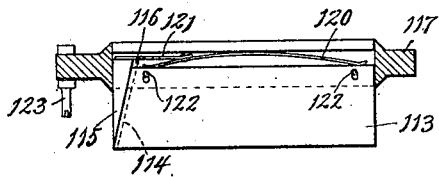

No. 646,419. Patented Apr. 3, 1900.
J. P. DORAN.
ROTARY ENGINE.
(Application filed May 1, 1899.)
(No Model.) 5 Sheets—Sheet 5.

Witnesses.
Inventor.
John P. Doran
By Benedict & Morsell
Attorneys.

THE NORRIS PETERS CO., PHOTO-LITHO., WASHINGTON, D. C.

UNITED STATES PATENT OFFICE.

JOHN P. DORAN, OF LARK, WISCONSIN.

ROTARY ENGINE.

SPECIFICATION forming part of Letters Patent No. 646,419, dated April 3, 1900.

Application filed May 1, 1899. Serial No. 715,152. (No model.)

*To all whom it may concern:*

Be it known that I, JOHN P. DORAN, of Lark, in the county of Brown and State of Wisconsin, have invented a new and useful Improvement in Rotary Engines, of which the following is a description, reference being had to the accompanying drawings, which are a part of this specification.

My invention has relation to improvements in rotary engines.

The primary object of the invention is to provide an improved construction of rotary engine whereby the greatest percentage of power is obtainable from a minimum amount of steam.

With the above primary and other incidental objects in view the invention consists of the devices and parts or their equivalents, as hereinafter more fully set forth.

Figure 1:
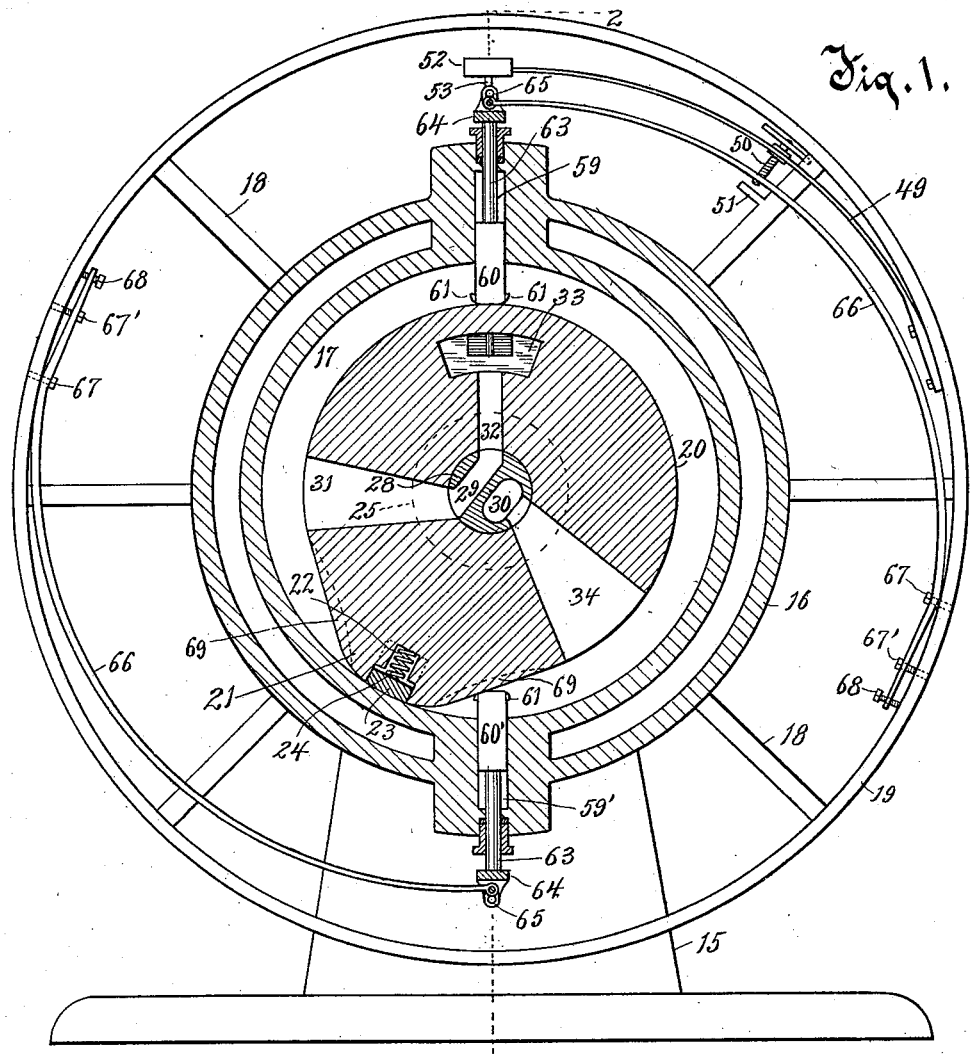
Figure 3:
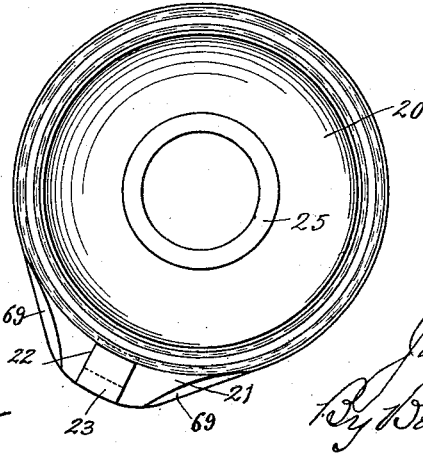
Figure 6:
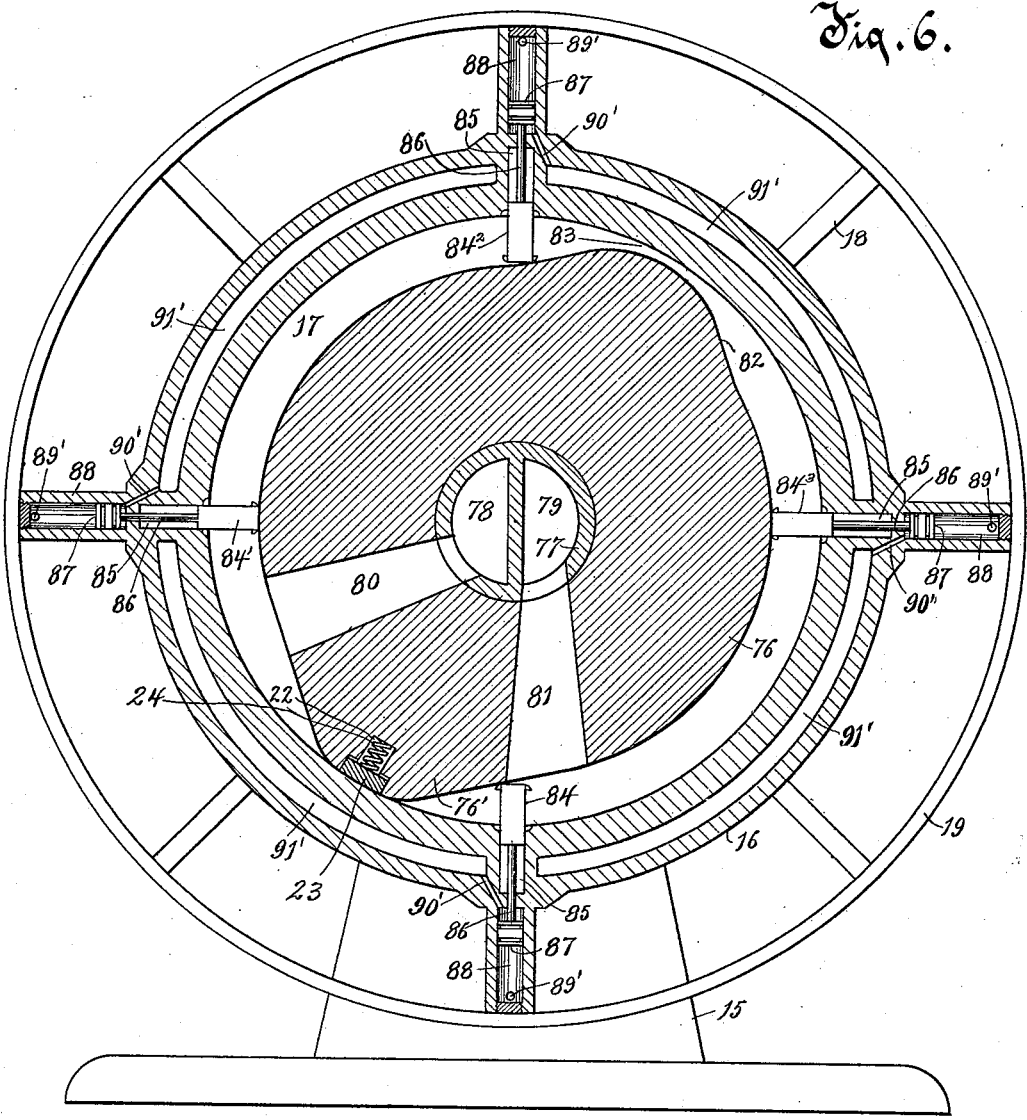
Figure 7:
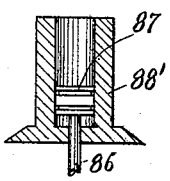
Figure 11:
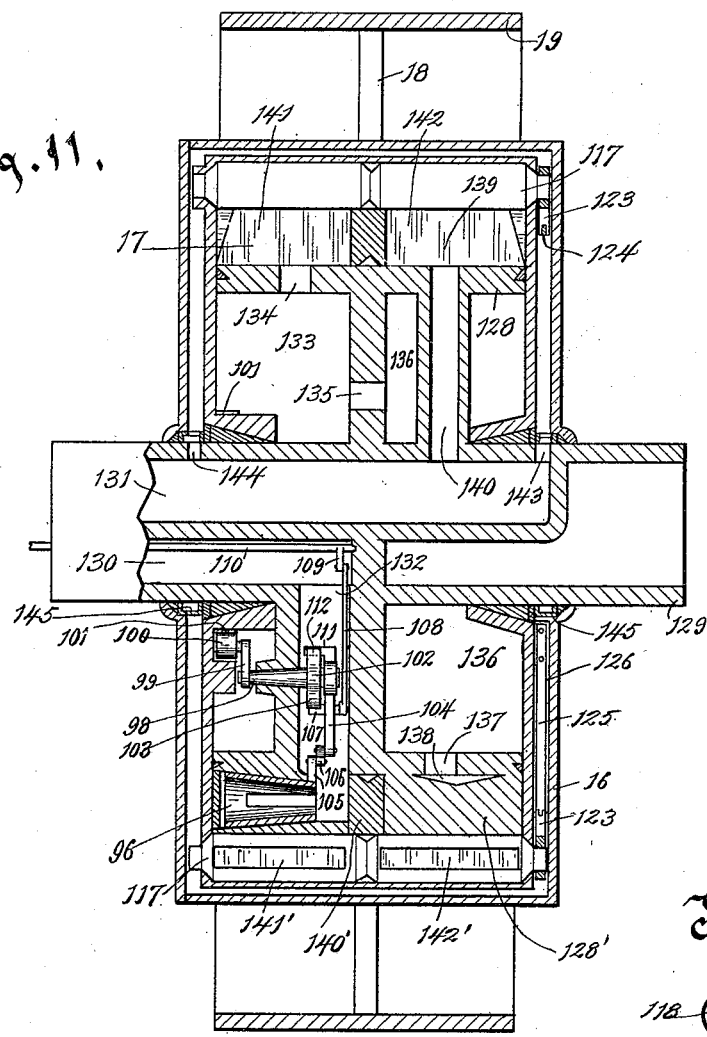
Figure 12:
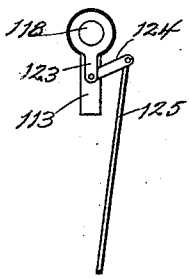
Figure 14:
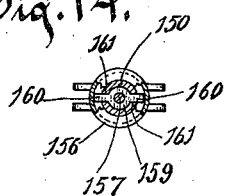
Figure 13:
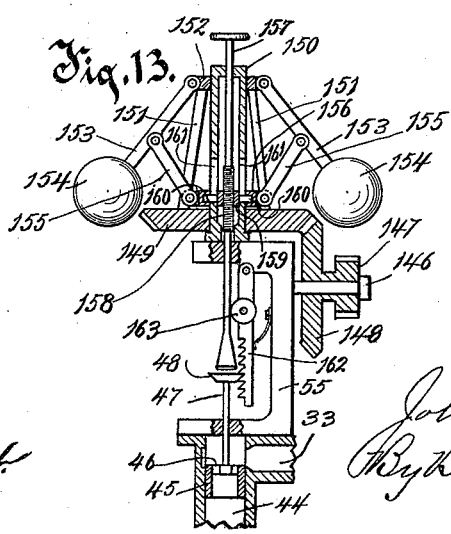

In the accompanying drawings, Figure 1 is a vertical sectional view through the piston-chamber and piston of an engine of my improved construction. Fig. 2 is a central transverse section of Fig. 1. Fig. 3 is a detail view of the piston. Fig. 4 is a detail view of the segmental rack. Fig. 5 is a detail view of a modified form of gate. Fig. 6 is a vertical sectional view through the piston-chamber and piston of a modified form of construction of a compound engine. Fig. 7 is a sectional view of a modified form of the mechanism for actuating the steam-gates of Fig. 6. Fig. 8 is a similar view to Fig. 6 of another form of the engine. Fig. 9 is a detail view of one of the steam-gates employed in the Fig. 8 construction. Fig. 10 is a plan view of a detail of Fig. 9. Fig. 11 is a transverse sectional view through another modified form of the engine. Fig. 12 is a detail view of the mechanism for operating the steam-gates of both the Figs. 8 and 11 constructions. Fig. 13 is a detail view of governor mechanism of modified form of construction. Fig. 14 is a cross-section through the tube shown in Fig. 13, with parts in section and parts broken away.

Throughout the several sheets of drawings the numeral 15 indicates the supporting-framework, and 16 a casing which forms an interior piston-chamber 17. This casing has radiating therefrom a series of spokes 18, which extend to and connect with an outer rim or periphery 19.

In the form of construction illustrated on Sheets 1 and 2 of the drawings the piston is indicated by the numeral 20, said piston having a cam formation 21 extending from one portion thereof and bearing against the wall of the chamber 17. The bearing edge of this cam is intersected by a recess 22, in which is fitted a packing-strip 23, said strip being pressed outwardly by means of a coiled spring 24. The piston is mounted fast on a non-rotatable shaft or axis 25. Said piston may be either separate from the shaft or axis and secured rigidly thereto, or it may be an integral part of the shaft or axis. The said shaft or axis is hollow or tubular to form an exhaust-steam passage 26, with which passage an exhaust-steam pipe 27 connects. Within the passage 26 is arranged a valve 28, formed with an intersecting live-steam passage 29 and with another exhaust-steam passage 30. The passage 29 communicates at one end with a gradually-divergent passage 31 in the piston and extending across through the edge of said piston in order to communicate with the chamber 17 and at its opposite end with another passage 32 in the piston, which passage 32 has a lateral branch 33 leading out through one side of the piston. The exhaust-steam passage 30 of the valve communicates with another gradually-divergent passage 34 in the piston and extending across in an opposite direction to the passage 31 and through the edge of the piston in order to communicate with the chamber 17. The valve-rod 35 of the valve extends outwardly through the closed end of the stationary shaft or axis 25 and has secured thereto a lever 36, said lever carrying an ordinary form of dog or pawl 37, which is adapted to engage any of the series of teeth in a toothed segment 38. By disengaging the dog from the segment and turning the lever it is obvious that the position of the valve can be regulated. The valve is surrounded for a short distance by a coiled spring 39, said spring having its inner end connected to a set-collar 40 and its outer end bearing against the inner side of the closed end of the shaft or axis 25. By means of this spring the valve is held to its proper longitudinal position in the passage 26. The shaft or axis 25 is also provided with another longitudinal passage or channel 41 for the live steam, a steam-inlet pipe 42 communicating with the outer end of this passage. The inner end of the passage 41 communicates with an annular passage 43. This annular passage communicates at one point with a valve-chamber 44, and this valve-chamber in turn is in communication with the lateral passage 33 of the piston. Within this valve-chamber is a valve 45, said valve preferably consisting of an annulus or ring, with an arm 46 extending across its upper end. To this arm is connected a valve-rod 47, the upper end of said rod being formed or provided with a beveled enlargement or head 48. Secured at one end to the inner side of the rim 19 is a flat spring 49. Passing through an intermediate point of this spring is a screw 50, said screw provided upon its outer end with a hand-wheel. The inner end of the screw is in line to engage a lug 51, projecting from one of the arms 18. At its free end the spring carries a governor-weight 52. Connected to and depending from one end of this weight is an arm 53, said arm passing through a tubular guide 54, said guide being formed at the outer end of the horizontal member of an angular bracket 55, said bracket being secured to one side of the casing 16. The lower end of the arm 53 has journaled therein an antifriction-roller 56. The arm 53 is in line with the valve-rod 47, so that on the down movement of the arm the antifriction-roller is brought into engagement with the upper end of the valve-rod, whereby said valve-rod and the valve carried thereby are forced downwardly. A toothed dog 57 depends from the horizontal member of the bracket 55 and any of the teeth of this dog are adapted to engage with the upper enlargement or head 48 of the valve-rod 47, being held in engagement therewith by means of a spring 58 pressing against the inner or untoothed edge of the dog.

It will be understood that, if desired, rod 47 and rod or arm 53 may be one and the trip mechanism dispensed with.

Fitting steam-tight within chambers or recesses 59 59' in diametrically-opposite portions of the casing 16 are steam-gates 60 60'. These gates extend into the piston-chamber 17, and their inner edges are adapted to bear against the piston. Projecting laterally from opposite sides of each gate, at the inner edge thereof, are beveled lugs 61 61. These lugs are provided so that when the casing has revolved sufficiently far to cause one of the gates to ride on the cam portion 21 the beveled surface of the lug will conform to the inclined surface of the cam, and thereby prevent wear, which would otherwise occur if these lugs were not provided by reason of the angle of the inner edge of the gate bearing on the inclined surface of the cam. In Fig. 5 one of these steam-gates is illustrated with only one of the laterally-projecting beveled lugs 61, and in lieu of the other lug a roller 62 is provided, which roller answers the same purpose as a lug. If desired, of course two rollers similar to 62 could be employed instead of two lugs 61. To the outer edge of each gate is connected a rod 63. Each rod extends outwardly through a stuffing-box, and the outer extremity of each rod is formed with a yoke-like portion 64, forming a bearing for a crank-shaft 65. To each crank-shaft is pivotally connected the end of a flat spring 66. The other end of each of these springs is preferably secured to the rim 19 by two screws 67 67', which pass through the spring and enter the rim. Another screw 68 passes through the spring, but does not enter the rim. By turning these several screws the tension of the spring may be regulated.

It will be noticed that the sides of the cam projection 21 are provided with a recess 69 69. (Shown in dotted lines in Fig. 1 and in full line in Fig. 3.) When the casing is in the position shown in Fig. 1, the air or any steam which may be in the space between the gate 60' and the contacting portion of the cam is free to pass from said space through the recess 69 into the chamber 17 on the other side of the gate, and when the gate 60' moves to the other side of the cam 21 the steam is free to flow through the other passage 69 and act against cam 21 of the fixed piston, so that the action of the steam against gate 60 will continue to rotate the engine.

If desired, one side of the rotatable casing 16 may be provided with a projecting shaft 70, the power from which may be employed for running a dynamo or other motor.

I prefer to surround the stationary shaft or axis 25 with suitable packings to take up the wear, said packings consisting of rings 71 71', located on opposite sides of the piston and having beveled outer rims or peripheries which mesh with corresponding beveled surfaces in the piston. A packing 72 bears against the ring 71, and a collar 73 bears against the packing 72, said collar being secured to the casing. A series of springs 74 bear against the ring 71'.

It will be understood that the casing 16 and the attached rim 19 are intended to be revolved, the rim forming a pulley around which a band may be passed for transmitting the power to any suitable machinery to be operated.

In the operation of the form of engine shown on Sheets 1 and 2 if the parts are in the position shown in Fig. 1 the live steam passes through the inlet-pipe 42, thence into the passage 41 into valve-chamber 44, through the upper open end of the valve 45, (said valve being normally held against movement by the engagement of the dog 37 with the valve-rod thereof,) thence into lateral passage 33, thence into passage 32 in the piston, thence into passage 29 in the valve 28, and thence into passage 31 of the piston and out of said passage into the piston-chamber 17 in the space of said chamber between the gate 60 and the contacting portion of the cam 21. This steam will now act on the gate 60 and cause the casing 16, with attached parts, to be rotated toward the right of Fig. 1. As the casing continues to thus rotate, the gate 60 is brought nearer and nearer to the passage 34. With this rotation also the gate 60' is carried around, being first acted upon by the cam 21 and forced outwardly by said cam into the chamber 59'. The moment it clears the highest point of the cam the spring 66 forces it inwardly again, said spring thereby always holding the inner edge of the gate in engagement with the edge of the piston. When the gate 60' passes the passage 31, the live-steam space is then between said gate and the cam projection 21. When the casing is rotated sufficiently far to bring the gate 60 into register with the passage 34, the steam between the two gates is then free to exhaust through said passage 34 into the passage 30 of the valve 28, thence into the passage 26 of the shaft 25, and finally out through the exhaust-pipe 27.

The operations just described are of course repeated as the casing is continuously rotated.

If it is desired to reverse the engine, all that is necessary to be done is to turn the valve 28 so that the passage 29 thereof will connect the two passages 32 and 34 of the piston, and the passage 30 of said valve made to register with the passage 31 of the piston. The live steam will then take the same course, as before described, to the passage 32, thence into passage 29, and thence through passage 34 into the piston-chamber 17. The exhaust-steam, on the other hand, will pass from the piston-chamber through passage 31, thence into passage 30 of the valve 28, and thence into passage 26 and out through the exhaust-pipe 27.

In the rotation of the casing if the speed becomes too great the weight 52 will fly out by centrifugal force and cause an uplifting of the arm 53. This will cause the roller 56 of said arm to act on an inclined surface 75 on the dog 57 and throw said dog inwardly, so as to release its teeth from engagement with the upper end of the valve-rod 47. The moment this release is effected the pressure of the steam against the lower end of the valve-rod 47 will cause an uplifting of the valve 45 and a consequent closing of the passage 33 to a sufficient extent either to entirely shut off the flow of the steam into said passage 33 or to limit the amount of steam passing therein to such an extent as to reduce the speed of rotation of the engine to the required amount. When the proper reduction of speed is secured, the weight 52 will again move inwardly and cause a descent of the arm 53, the roller 56 of said arm acting on the upper end of the valve-rod 47, so as to cause a descent of said rod and its valve the required distance to fully open the passage 33. As soon as the arm 53 has thus descended a sufficient distance to bring the roller 56 thereof out of contact with the beveled surface 75 the spring 58 will then force the dog 57 outwardly, so as to cause a tooth of said dog to engage the valve-rod 47, and thereby hold the valve down until the speed of the engine again becomes too fast.

In the form of engine shown in Fig. 6 the piston is indicated by the numeral 76 and the fixed shaft or axis by the numeral 77. This shaft or axis has two passages—namely, an inlet-passage 78, which connects with a suitable inlet-pipe, (not shown,) and an exhaust-passage 79, which connects with an exhaust-pipe. (Not shown.) The piston is provided with a passage 80, registering at its inner end with the inlet-passage 78 and having its outer end opening into the piston-chamber 17, and said piston is also provided with another passage 81, registering at its inner end with the exhaust-passage 79 and having its outer end opening into the piston-chamber 17. The piston is also provided with a cam projection 76', similar to the cam projection 21 of the Fig. 1 form of construction. At a diametrically-opposite point said piston is also provided with another cam projection 82, said cam projection 82 being out of contact with the casing, so as to leave a passage 83. In this form of device there are four steam-gates, designated, respectively, by the numerals 84, 84', 84$^2$, and 84$^3$, which work in the chambers 85 of the casing. To each of these gates is connected a rod 86, each rod provided on its outer end with a piston 87, which works in a cylinder 88 therefor. Each of these cylinders has a steam-inlet port 89', which is connected with any suitable means of steam-supply. For instance, each port 89' could be connected with the steam-inlet passage 78 of shaft or axis 77. From the lower ends of the cylinders 88 diagonal ducts 90' extend and open in the chamber 91'. It will be understood that this form is a compound engine. In the operation of this form of device in the position of the parts shown in Fig. 6 the live steam passes along the passage 78, thence into passage 80, and thence into the space of the piston-chamber 17 between the cam projection 76' and the gate 84'. The steam thus acting against this gate will cause a rotation of the casing, and as the casing continues to rotate the gates are successively brought in advance of the passage 80, so as to be acted upon by the steam between the gate and the cam projection.

By the provision of the cam 82 and the passage 83 when a gate reaches a certain point in its travel and starts up the cam 82 the steam in advance thereof is free to pass through the passage 83 and press against the next succeeding gate, (the gate 84$^3$ in the illustration.) The gate 84$^2$, however, being brought into contact with the cam 82, a portion of the gate is moved outwardly, and consequently the said steam in advance of said gate is pressing against a very much less area of gate 84$^2$ than of gate 84$^3$, and said steam is also pressing against the fixed piston 82. The excess pressure against gate 84³ therefore will assist in rotating the engine, and thereby provide a compound action. As the gates with the continued rotation of the casing successively register with the passage 81, the steam back of said gates is free to exhaust into the passage 81, thence into passage 79 of the fixed axis 77, and finally out through the discharge-pipe.

In Fig. 7 is shown a modified form of mechanism for holding the inner edge of each steam-gate in contact with the edge of the piston. In this form a cylinder is employed (designated by the numeral 88') which is somewhat larger in diameter than the cylinder 88. This cylinder 88' has an open outer end, and the piston 87 therein is adapted to be acted upon by air-pressure.

In the Fig. 8 form of construction the numeral 89 indicates the piston, and 90 the fixed shaft or axis thereof. The shaft or axis is constructed similar to the shaft 77 of Fig. 6—that is to say, it is provided with an inlet-passage (indicated by the numeral 91) which is connected with a steam-supply pipe, (not shown,) and said shaft or axis is also provided with an exhaust-passage (indicated by the numeral 92) connected with an exhaust-pipe. (Not shown.) The piston is also provided with an inlet-passage 93, which is in communication at one end with the inlet-passage 91, and said piston is also provided with an exhaust-passage 94, which is in communication at one end with the exhaust-passage 92 of the shaft or axis and at its other end with the piston-chamber. The cam projection 89² of the piston 89 is somewhat broader at its point of contact than the cam projections of the other forms of piston and is advisably provided with two of the spring-actuated packing-strips. The outer end of the passage 93 of the piston communicates with a small duct 95, which duct leads to the piston-chamber 17. Communication between the passage 93 and the duct 95 is controlled by means of a tubular valve 96, said valve having a port 97, which may be brought into register with the duct 95. Journaled in suitable bearings in the passage 93 is a rock-shaft 98. Mounted fast on this rock-shaft is an arm 99, which carries at its end an antifriction-roller 100. This roller is adapted to ride on a cam 101, which cam is rigid with or an integral part of the casing 16. Also mounted fast on the shaft 98 is a collar 102, said collar provided with a projecting lug 103. Mounted loosely on the rock-shaft and depending therefrom in an arm 104. The lower end of this arm 104 is connected to an arm 105, projecting from the valve 96, by means of a short link 106. Pivoted to arm 104 is a lever 107. The short arm of this lever is adapted normally to engage with the shoulder 103 of the rigid collar 102. The long arm of this lever has pivotally secured thereto a link 108. The inner end of this link extends into the passage 91 and is connected to one end of a crank 109, the other end of said crank being connected to a rod 110, which extends longitudinally through the passage 91 and out through the end of the fixed shaft or axis 90. The outer extremity of the rod 110 is connected to any suitable mechanism for operating it—such, for instance, as the mechanism shown in my application for United States Letters Patent, filed March 10, 1898, Serial No. 673,289, and allowed October 18, 1898. It will be understood that the upper end of the arm 104 forms a projecting lug 111, and this lug is adapted to engage a second shoulder 112 on the collar 102. This form of the invention also comprehends a modified construction of steam-gates. Two of such gates are shown arranged at diametrically-opposite points of the casing. These gates instead of moving in and out, as in the preceding forms of construction, are adapted, when they are brought into contact with the cam 89², to be swung outwardly into recesses therefor in the casing. One of these gates is indicated by the numeral 113, and the other gate by the numeral 113'. Each gate has one edge beveled and provided with a dovetail recess 114. A separate end strip 115, provided with a registering beveled edge, is fitted to this beveled edge of the gate, said strip being provided with a dovetail tongue 116, fitting the dovetailed recess 114. The numerals 117 117 indicate rock-shafts, which are fitted in circular recesses 118 118 therefor in the casing, the ends of said rock-shafts being journaled in suitable bearings in the end walls of the recesses 118. Each rock-shaft is provided with a suitable recess 119, in which the gate and its end strip are fitted. A flat spring 120 is arranged in this recess between the outer edge of the gate and the wall of said recess, and the ends of this spring bear on the outer edge of the gate in order to hold the inner edge of said gate inwardly in contact with the edge of the piston. Another spring 121 is also similarly disposed, and its free end bears on the outer edge of the strip 115. By the provision of the strip 115 and the sliding connection between the same and the gate wear on the side edges of the gate is compensated for, inasmuch as, as wear occurs, it is taken up by reason of the gate being forced inwardly and the width thereof thereby increased slightly by reason of the matching beveled surfaces. Each gate is held in its recess 119 by means of pins 122 passing through elongated slots in the gate and entering the rock-shaft. By passing these pins through slightly-elongated slots the inward play of the gate is not interfered with. To one of the journals or ends of each shaft 117 is connected a crank-arm 123. The connection for this crank-arm is illustrated in Figs. 11 and 12 of Sheet 5 of the drawings, from which figures it will be seen that a link 124 is connected to the crank-arm at one end, and to the other end of said link a flat spring 125 is connected. This flat spring is disposed and secured at its inner end in a suitable recess 126. In the operation of this form of the device, the parts being in the position shown in Fig. 8, steam is entirely cut off from the piston-chamber. When the casing is rotated a sufficient distance to bring the roller 100 on the raised portion of the cam 101, the collar 102 is turned so as to cause shoulder 103 to act on the short end of the lever 107, whereby the valve is opened and the steam is free to pass from the passage 91 into passage 93, thence enter the open end of valve 96, and thence pass through the port 97 of said valve into duct 95 and through said duct into the space of the piston-chamber between the cam projection $89^2$ and the gate 113. The steam acting against the gate 113 will cause the casing to revolve, and as the cam 101 is rigid to the casing said cam of course is necessarily revolved therewith. After the cam is thus revolved a certain distance the roller 100 of the arm 99 will ride on the reduced portion of said cam, and this will cause a turning of the arm 99, and a consequent turning of the rock-shaft 98 and the collar 102, fixed to said shaft. The turning of this collar will cause the shoulder 112 thereof to act on the lug 111. This will cause a turning of the arm 104 on the rock-shaft 98, and this turning of the arm 104 through the link 106 and the valve-arm 105 will cause a turning of the valve 96 to such an extent as to throw the port 97 of the valve out of register with the duct 95, and consequently shut off further flow of steam into the piston-chamber 17, as shown in Fig. 8. The casing, therefore, will now be rotated merely by the expansive power of the steam acting against the steam-gate, and this rotation of the casing by the expansive power of the steam alone will continue until the raised portion of the cam 101 is again brought into contact with the roller 100.

It will be understood that when the casing is rotated sufficiently far to bring one of the gates into engagement with the cam $89^2$ said cam will turn the gate outwardly into a recess 127, provided for its accommodation in the casing 16. The moment the gate passes the cam the spring 125, through the described connections, will act on the journal of the rock-shaft 117 and cause the return of the gate to its normal position. It will be further understood that the steam in the space of the piston-chamber in advance of one of the gates—as, for instance, the gate 113', Fig. 8—is free to exhaust through the passage 94 into passage 92 and finally out through the exhaust-pipe.

Whenever the speed of the engine becomes too great and the rod 110 is consequently operated in one direction by the mechanism controlling the same, the crank 109 will act on the link 108 and cause a turning of the lever 107 on its pivot, so as to free the short arm of said lever from contact with the shoulder 103 of the collar 102, and consequently keep the valve 96 at a closed position. When this occurs and when the raised portion of the cam 101 acts on the roller 100 and turns the arm 99, and consequently turns the shaft 98 and the collar 102, the turning of said collar has no effect on the arm 104, which, as before described, is loose on the shaft, and consequently the valve 96 is not affected, but remains closed and continues to shut off the supply of steam to the piston-chamber, and this action is continued until the proper speed is again reached, at which time the rod 110 is rotated in a direction to cause rod 108 to turn lever 107 and bring the end of the short arm of said lever in contact with the shoulder 103, whereby said lever 107 is turned and the valve 96 again turned to an open position.

In Fig. 11 of the drawings is illustrated another form of compound engine, in which, in one side of the casing, the working parts of the Fig. 8 form of construction are duplicated and designated by the same reference-numerals, while on the other side another form of construction is provided. The piston in this Fig. 11 form of construction is indicated by the numeral 128, and the cam projection thereof by the numeral 128'. The stationary shaft or axis for the piston is designated by the numeral 129. This shaft or axis is provided with an inlet steam-passage 130, which is in communication with an inlet-pipe, (not shown,) and is also provided with an exhaust-passage 131, which is in communication with an exhaust-pipe. (Not shown.) The passage 130 communicates with a passage 132 in the piston, similar to the passage 93 of the Fig. 8 form, and the outer end of this passage 132 communicates with a duct leading to the piston-chamber 17, said duct being controlled by the valve 96, provided with the port 97, the same as in the Fig. 8 form of construction. This valve is also provided with the projecting arm 105, which is connected to arm 104 by means of the link 106, said arm 104 being loosely mounted on rock-shaft 98 and said arm also provided at its upper end with the projecting lug 111. Mounted fast on the rock-shaft 98 is the collar 102, which is provided with the projecting shoulders 103 and 112. Also mounted fast on the rock-shaft 98 is the arm 99, which carries the antifriction-roller 100, which roller rides on the cam 101, which cam is rigid or integral with the casing 16. The arm 104 has also pivoted thereto the lever 107, and to the long arm of this lever is connected the link 108, the inner end of said link being jointed to the crank-arm 109, extending from the end of the rod 110, which rod 110 passes longitudinally through the inlet-passage 130 of the shaft 129 and through the outer end of said shaft to be connected to suitable mechanism for operating the same, as in the Fig. 8 form of construction. Formed in one side of the piston is a chamber 133, a port 134 leading from the piston-chamber 17 into said chamber 133.

Another port 135 places the chamber 133 into communication with an annular chamber 136 on the right-hand side of a central line drawn through the engine. Chamber 136 communicates by way of a duct 137 with a passage 138, which passage 138 in turn communicates with the right-hand piston-chamber 139, said chamber 139 being in communication with a passage 140, the inner end of said passage 140 opening into the exhaust-passage 131 of the shaft or axis 129. The two piston-chambers 17 and 139 are separated by means of an annular partition 140'. The steam-gates for the left-hand piston-chamber 17 are indicated by the numerals 141 141' and the steam-gates for the right-hand piston-chamber by the numerals 142 142'. These gates are carried on rock-shafts 117, the same as the rock-shafts designated by a like numeral in Fig. 8. One of these rock-shafts carries the gates 141 and 142 and the other rock-shaft the gates 141' and 142'. The gates are actuated in the same manner as the gates shown in Fig. 8, so as to be swung outwardly in suitable recesses therefor in the casing. In the operation of this form of the invention the live steam passes into the passage 130, thence into passage 132, thence through the valve 96, through the port 97 of said valve, and into the piston-chamber 17, where it acts upon the steam-gates in exactly the same manner as explained in regard to the Fig. 8 form of construction. The mechanism for turning the valve 96 also operates in exactly the same manner as described with reference to the Fig. 8 form by the action of the cam 101 on the roller 100, so that when the steam is cut off the engine is rotated by the expansive power of the steam alone. When the steam has completed its work in the piston-chamber 17, it passes through the port 134 into the chamber 133, thence by port 135 into chamber 136, passing from said chamber, by way of the duct 137 and passage 138, into the right-hand piston-chamber 139. When the steam has completed its work in this chamber, it passes, by way of the passage 140, into exhaust-passage 131 for final exit. Some of the exhaust-steam which passes into this exhaust-passage 131 is free to flow through a port 143 and thence around the piston-casing and finally out through a port 144 back into the exhaust-passage 131. If preferred, all the exhaust-steam which passes through passage 140 into passage 131 may be first carried directly through the port 143 and thence around the casing and out of the port 144 into the exhaust-passage 131. In order to accomplish this, all that will be necessary will be to place a partition in the passage 131, at any point of said passage between the passage 140 and the port 144. At the points where the casing 16 contacts with the stationary shaft or axis 129 are disposed rings 145 145, said rings being advisably of U shape in cross-section. Packings are preferably provided on each side of the rings. The rings are also provided with ports or openings registering with the ports 143 and 144, so as to afford free passage of the steam from exhaust-passage 131 and to said exhaust-passage. The object of these rings is to provide for the circulation of the dead steam around the shaft and into the casing at all times. While I have described the piston as stationary in this Fig. 11 form of construction, as well as in the other forms of construction, yet I do not desire to limit myself to this, inasmuch as in all the several forms the engine will successfully work if this arrangement is reversed—that is to say, the piston made revoluble and the casing stationary.

In Figs. 13 and 14 I show a modified form of governor mechanism for regulating the admission of the inlet-steam, said governor mechanism to be used in lieu of the spring 49 and weight 52. (Shown in Figs. 1 and 2 of the drawings.) It will be understood that either the governor mechanism represented in said Figs. 1 and 2 or the governor mechanism now about to be described may be employed in all the several forms of construction herein illustrated and described or in any other form of engine. In this form a short shaft or axle 146 projects laterally from the bracket 55, and on this shaft or axis is mounted a gear-wheel 147, said gear-wheel being in mesh and driven by a gear-wheel (not shown) carried by the rotatable part of the engine. The gear-wheel 147 has rigid to or integral therewith a bevel-gear 148, said bevel-gear being in mesh with another bevel-gear 149, said bevel-gear 149 carried loosely at the lower end of a tubular shaft or axis 150, extending upwardly from the horizontal member of the bracket 55. Extending upwardly from the upper side of the bevel-gear 149 are arms 151, said arms supporting at their upper ends a collar 152, which loosely surrounds the tubular axis 150. Pivoted to the collar 152 are arms 153 153, which carry at their lower ends the governor-balls 154 154. Pivotally connected to the arms 153 are links 155 155, said links having their inner ends pivotally connected to a collar 156, which collar loosely surrounds the tubular axis 150. Extending through the tubular axis 150 is a rod 157, said rod being formed intermediate of its ends with a threaded portion 158. The rod 157 extends through the lower end of the tubular axis 150 and also through the horizontal member of the bracket 55, and its lower end is in line to engage with the upper beveled headed portion or enlargement 48 of the valve-rod 47. The upper end of the rod 157 is preferably provided with a hand-wheel for convenience in turning the same, and the lower extremity of the rod is of conical form. Within the tubular axis 150 and adapted to engage the threaded portion 158 of the rod 157 is a nut 159, said nut being held against rotation by being provided with the laterally-projecting fingers 160 160, said fingers passing through opposite elongated slots 161 in the tubular axis 150 and extending into the collar 156. Depending from the horizontal member of the bracket 55 is a toothed dog 162, any of the series of teeth of said dog adapted to engage the beveled enlargement or head 48 of the valve-rod 47. The dog has also secured thereto a roller 163, which roller bears against the rod 157. In the operation of this governor mechanism as the revolving part of the engine rotates and this rotation is communicated to the gear-wheel 147 by the intermeshing gear from the rotatable part of the engine this rotation is conveyed to the bevel-gear 148 and also to the bevel-gear 149. Bevel-gear 149 will cause the arms 151 and the collar 152 connected thereto, as well as the governor-ball arms 153, governor-balls 154, and collar 156, to be carried around therewith. As the speed of the engine increases the governor-ball arms will fly outwardly by centrifugal force. This has the effect of raising the collar 156, and as said collar is raised the nut 159 is also raised, and consequently the rod 157. As said rod 157 is thus raised, as soon as the lower beveled or conical end thereof reaches the roller 163 the toothed dog 162 will be forced laterally out of engagement with the upper beveled head or enlargement 48 of the valve-rod 47. The steam, therefore, which enters through the passage 44 will act against the lower end of the valve-rod 47 and cause an uplifting of the valve 45 in order to shut off the flow of steam through the passage 33 into the piston-chamber, and thereby of course reducing the speed of the engine. When the speed has become reduced to a normal, the governor-balls will move inwardly and the collar 156 be again forced downwardly. This will have the effect of lowering the rod 157 and causing its lower end to contact with the upper end of the valve-rod 47, and consequently lower said valve-rod and the valve carried thereby, so as to again open the passage 33, as shown in Fig. 13. In the lowering of the rod 157 in the manner described, as soon as the lower beveled or conical end of said rod passes off the roller 163 the toothed dog is free to swing laterally, so that one of its teeth may again engage the upper beveled enlargement or head of the valve-rod 47, thereby retaining the valve in its open position. The position of the rod 157 is adjusted by turning said rod through the nut 159.

While in the preceding description steam has been described as the actuating medium, yet I do not wish to be understood as confining myself thereto, inasmuch as the construction is such that any other suitable actuating medium—such as air, gas, or the like—may be employed without departing from the spirit and scope of my invention.

What I claim as my invention is—

1. The combination, of a valve arranged in an inlet-passage, said valve provided with a projecting valve-rod, means engaging the valve-rod in order to hold the valve at an open position under a certain speed of rotation, governor mechanism adapted, when the speed exceeds a certain limit, to act on the engaging mechanism so as to release the same and permit the valve-rod to move by the pressure of the actuating agent and to thereby carry the valve to or toward a closed position, and to act on said valve-rod to reopen the valve, when the speed of the engine is reduced, and means for throwing the engaging mechanism into engagement with the valve-rod, when the valve is again moved toward or to an open position.

2. The combination, of a valve arranged in an inlet-passage, said valve provided with a projecting valve-rod, a dog adapted to engage the valve-rod in order to hold the valve in an open position under a certain speed of rotation, an arm, and governor mechanism connected to said arm and adapted to move the arm on an increased speed of rotation, and thereby throw the dog out of engagement with the valve-rod to permit said valve-rod to move by pressure of the actuating agent and thereby carry the valve to or toward a closed position, and when the speed is reduced, said governor mechanism acting on the arm so as to force the valve-rod and the valve carried thereby to an open position, and to permit the dog to again engage the valve-rod to hold the valve to its open position.

3. The combination, of a valve arranged in an inlet-passage, said valve provided with a projecting valve-rod, a dog adapted to engage the valve-rod in order to hold the valve in an open position under a certain speed of rotation, an arm, a spring having one end connected to a rotatable portion of the mechanism, and a weight connected to the free end of the spring, and from which weight the arm depends, said weight adapted on an increased speed of rotation to fly outwardly and thereby throw the dog out of engagement with the valve-rod, to permit said valve-rod to move by pressure of the actuating agent and thereby carry the valve to or toward a closed position, and when the speed is reduced, said weight and the arm extending therefrom moving in an opposite direction so as to force the valve-rod and the valve carried thereby to an open position, and to permit the dog to again engage the valve-rod and hold the valve to its open position.

4. In a rotary engine, the combination, of a shaft or axis, a casing forming an interior piston-chamber, a piston within said chamber, one of the latter parts being rotatable and said piston provided with a projecting cam bearing against the wall of the piston-chamber, and said piston also provided with passages in communication with the piston-chamber and in communication with other passages, one of said latter passages being adapted to act as an inlet-passage, and the other of said latter passages as an exhaust-passage, a valve for controlling the inlet, said valve provided with a projecting valve-rod, means engaging the valve-rod to hold the valve at an open position under a certain speed of rotation of the engine, governor mechanism adapted, when the speed exceeds a certain limit, to act on the engaging mechanism so as to release the same and permit the valve-rod to move by the pressure of the actuating agent and thereby carry the valve to or toward a closed position, and to act on said valve-rod to reopen the valve when the speed of the engine is reduced, means for throwing the engaging mechanism into engagement with the valve-rod when the valve is again moved toward or to an open position, and movable gates adapted to bear against the edge of the piston.

5. In a rotary engine, the combination, of a shaft or axis, a casing forming an interior piston-chamber, a piston within said chamber, one of the latter parts being rotatable, and said piston provided with a projecting cam bearing against the wall of the piston-chamber, and said piston also provided with passages in communication with the piston-chamber and in communication with other passages, one of said latter passages being adapted to act as an inlet-passage, and the other of said latter passages as an exhaust-passage, a valve for controlling the inlet-passage, said valve provided with a projecting valve-rod, a dog adapted to engage the valve-rod in order to hold the valve in an open position under a certain speed of rotation of the engine, an arm, governor mechanism connected to said arm, and adapted to move the arm on an increased speed of rotation of the engine and thereby throw the dog out of engagement with the valve-rod to permit said valve-rod to move by pressure of the actuating agent and thereby carry the valve to or toward a closed position, and when the speed of the engine is reduced, said governor mechanism acting on the arm so as to force the valve-rod and the valve carried thereby to an open position, and to permit the dog to again engage the valve-rod to hold the valve to its open position, and movable gates adapted to bear against the edge of the piston.

6. In a rotary engine, the combination, of a casing forming an interior piston-chamber, a piston within the chamber, said piston provided with a projecting cam bearing against the wall of the piston-chamber, means for introducing an actuating agent into the piston-chamber and for exhausting the same therefrom, movable gates adapted to bear against the piston, each of said gates having a slight in-and-out movement independent of its main movement, and each of said gates having one side edge beveled, a beveled strip slidingly fitting the beveled side edge of the gate, and a spring or springs bearing against the outer edge of the gate and of the strip.

7. In a rotary engine, the combination, of a shaft or axis, a casing forming an interior piston-chamber, a piston within said chamber, one of the latter parts being rotatable and said piston provided with projecting cams the edge of one of said cams being free from contact with the wall of the piston-chamber, means for introducing an actuating agent into the piston-chamber and for exhausting the same therefrom, and two sets of movable gates adapted to bear against the piston.

8. In a rotary engine, the combination, of a shaft or axis, a casing forming an interior piston-chamber, a piston within said chamber, one of the latter parts being rotatable, and said piston provided with a projecting cam bearing against the wall of the piston-chamber, and said piston also provided with passages in communication with the piston-chamber and in communication with other passages, one of said latter passages being adapted to act as an inlet-passage, and the other of said latter passages as an exhaust-passage, a cam, an arm adapted to ride on said cam, a valve for controlling the passage of the piston which is in communication with the inlet-passage, a connection between the arm and said valve, whereby said arm at certain periods of its movement on the cam is adapted to hold the valve open, and at certain other periods to turn the valve to a closed position so as to shut off flow of the actuating agent into the piston-chamber, and movable gates adapted to bear against the piston.

9. In a rotary engine, the combination, of a shaft or axis, a casing forming an interior piston-chamber, a piston within said chamber, one of the latter parts being rotatable, and said piston provided with a projecting cam bearing against the wall of the piston-chamber, and said piston also provided with passages in communication with the piston-chamber and in communication with other passages, one of said latter passages being adapted to act as an inlet-passage, and the other of said latter passages as an exhaust-passage, a cam, a rock-shaft, an arm mounted fast on said shaft and bearing on the cam, a collar mounted fast on the shaft and provided with projecting shoulders, an arm mounted loosely on the shaft and provided with projections adapted to be engaged by the shoulders of the collar, a valve for controlling the passage of the piston which is in communication with the inlet-passage, a connection between the arm which is loosely mounted on the rock-shaft and this valve, and movable gates adapted to bear against the piston.

10. In a rotary engine, the combination, of a shaft or axis, a casing forming an interior piston-chamber, a piston within said chamber, one of the latter parts being rotatable, and said piston provided with a projecting cam bearing against the wall of the piston-chamber, and said piston also provided with passages in communication with the piston-chamber and in communication with other passages, one of said latter passages being adapted to act as an inlet-passage, and the other of said latter passages as an exhaust-passage, a cam, a rock-shaft, an arm mounted fast on said shaft and bearing on the cam, a collar mounted fast on the shaft and provided with projecting shoulders, an arm mounted loose on the shaft and provided with a projecting lug, which lug is adapted to be acted upon by one of the shoulders of the collar, a valve for controlling the passage of the piston which is in communication with the inlet-passage, a connection between the arm which is loosely mounted on the rock-shaft and this valve, a lever pivotally connected to the loose arm, one end of the lever adapted to be acted upon by the other shoulder of the collar, a longitudinal rod, a crank at the end of said rod, a link connecting the crank with the pivoted lever, means for actuating the rod, and movable gates adapted to bear against the piston.

11. In a rotary engine, the combination, of a shaft or axis, a casing forming two interior piston-chambers, one of the latter parts being rotatable, and said piston provided with a projecting cam for both piston-chambers, and bearing against the walls of said chambers, and said piston also provided with a passage in communication with the piston-chamber on one side of the casing, and also in communication with another passage, the latter passage being adapted to act as an inlet-passage, the piston on this side of the casing having a chamber into which the actuating agent is free to pass after performing its work on said side of the casing, the chamber referred to being in communication with a chamber on the opposite side of the casing, and said latter chamber being in communication with the piston-chamber on this latter side of the casing, the last-referred-to-piston-chamber being in communication with an exhaust-passage, and movable gates for the respective piston-chambers, and adapted to bear against the piston.

12. In a rotary engine, the combination, of a shaft or axis, a casing forming an interior piston-chamber, a piston within said chamber, one of the latter parts being rotatable, and said piston provided with a projecting cam bearing against the wall of the piston-chamber, and also provided with passages in communication with the piston-chamber and in communication with other passages, one of the latter passages being adapted to act as an inlet-passage, and the other of said latter passages as an exhaust-passage, a passage around the casing and separate from the piston-chamber, said passage being in communication with the exhaust from the piston-chamber and also in communication with the main exhaust-passage, and movable gates adapted to bear against the piston.

13. In a rotary engine, the combination, of a shaft or axis, a casing surrounding the same and forming an interior piston-chamber, a piston within said chamber, one of the latter parts being rotatable, and said piston provided with a projecting cam bearing against the wall of the piston-chamber, means for introducing an actuating agent into and for exhausting the same from the piston-chamber, rings U-shaped in cross-section surrounding the shaft or axis between said shaft or axis and the casing, the open sides of said rings being in communication with the exhaust-passage, and movable gates adapted to bear against the piston.

In testimony whereof I affix my signature in presence of two witnesses.

JOHN P. DORAN.

Witnesses:
A. L. MORSELL,
ANNA V. FAUST.